(12) United States Patent
Overton

(10) Patent No.: US 11,785,057 B1
(45) Date of Patent: Oct. 10, 2023

(54) INCREASE SERVICE RELIABILITY BY REUSING SESSION-STATEFUL SERVICE INSTANCES WITHIN A SINGLE LONG-LIVED SESSION

(71) Applicant: Microsoft Technology Licensing, LLC, Redmond, WA (US)

(72) Inventor: Mark Edward Overton, Cambridge (GB)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/662,348

(22) Filed: May 6, 2022

(51) Int. Cl.
*H04L 65/1096* (2022.01)
*H04L 65/1076* (2022.01)
*H04L 65/1069* (2022.01)
*H04L 65/1104* (2022.01)

(52) U.S. Cl.
CPC ...... *H04L 65/1096* (2013.01); *H04L 65/1069* (2013.01); *H04L 65/1076* (2013.01); *H04L 65/1104* (2022.05)

(58) Field of Classification Search
CPC ............. H04L 65/1096; H04L 65/1104; H04L 65/1069; H04L 65/1076; H04L 63/0876; H04L 63/083

USPC .......................................................... 709/204
See application file for complete search history.

(56) References Cited

U.S. PATENT DOCUMENTS

2018/0337862 A1* 11/2018 Sharma ............... H04L 43/0829
2020/0218983 A1* 7/2020 Thornton ............ H04L 63/1425

FOREIGN PATENT DOCUMENTS

EP             2112799 A1 * 10/2009      ....... H04L 29/06319

* cited by examiner

*Primary Examiner* — Glenford J Madamba
(74) *Attorney, Agent, or Firm* — ArentFox Schiff LLP

(57) ABSTRACT

Described are examples for techniques to increase service reliability by reusing session-stateful service instances within a single long-lived session. A system for routing sessions within a network includes a first server hosting a first instance of a first service configured to establish a first network session for a subscriber with a first instance of a second service. The system includes a second server hosting the first instance of the second service configured to select the first instance of the first service to establish a second network session for the subscriber. The second service may copy header information from a first session invite to a second session invite for the second network session. The first network session remains active for a duration of the second network session. Reusing the first instance of the first service reduces the number of potential failure points to increase reliability of the long-lived session.

20 Claims, 5 Drawing Sheets

INCREASE SERVICE RELIABILITY BY REUSING SESSION-STATEFUL SERVICE INSTANCES WITHIN A SINGLE LONG-LIVED SESSION

BACKGROUND

An access network may provide multiple user devices with access to a network that provides connectivity between users and various services. For example, in a radio access network (RAN), the user devices may wirelessly communicate with a base station, which forwards the communications towards a core network. The core network may connect the user devices to various internet protocol (IP) services. In some networks, IP services may be provided my multiple instances, which may be instantiated on geographically distributed computing resources. For example, a public cloud network may provide generic computing resources that can host an instance of a service in a region.

To provide an IP service to a user, a network may often establish multiple sessions between services within a network. For example, access to services hosted within a cloud network may include a session border control (SBC) service to interconnect networks and secure communications. As the number of services and sessions for providing a service to a user increases, the likelihood of a failure at one or more instances of services may also increase. In particular, for session stateful services, failure of one service may result in failure of the service for the user. Accordingly, there is a need in the art for improving the reliability of session stateful service instances.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to a system for routing sessions within a network, including: a first server hosting a first instance of a first service configured to establish a first network session for a subscriber with a first instance of a second service; and a second server hosting the first instance of the second service configured to select the first instance of the first service to establish a second network session for the subscriber, wherein the first network session remains active for a duration of the second network session.

In some aspects, the techniques described herein relate to a system, wherein to select the first instance of the first service, the second service is configured to copy header information from a first session invite received at the first instance of the second service to a second session invite for the second network session.

In some aspects, the techniques described herein relate to a system, wherein the header information includes an internet protocol (IP) address of a source of the first session invite.

In some aspects, the techniques described herein relate to a system, wherein the first service is configured to add an identifier of the first instance of the first service to the header information of the first session invite.

In some aspects, the techniques described herein relate to a system, wherein the first service is a session border control (SBC) service and the second service is a voicemail service.

In some aspects, the techniques described herein relate to a system, wherein the second network session is for a call for the subscriber to a third party number that is initiated by the voicemail service using the same instance of the SBC service.

In some aspects, the techniques described herein relate to a system, wherein the network is a public cloud network, and wherein the SBC service controls access to the public cloud network.

In some aspects, the techniques described herein relate to a system, wherein the second network session is for a call to a second voicemail service using the same instance of the SBC service.

In some aspects, the techniques described herein relate to a method of routing sessions, including: establishing a first network session for a subscriber using a first instance of a first service and a first instance of a second service; and selecting, by the first instance of the second service, the first instance of the first service to establish a second network session for the subscriber, wherein the first network session remains active for a duration of the second network session.

In some aspects, the techniques described herein relate to a method, wherein selecting the first instance of the first service to establish the second network session includes copying header information from a first session invite received at the first instance of the second service to a second session invite for the second network session.

In some aspects, the techniques described herein relate to a method, wherein the header information includes an internet protocol (IP) address of a source of the first session invite.

In some aspects, the techniques described herein relate to a method, wherein the first service is configured to add an identifier of the first instance of the first service to the header information of the first session invite.

In some aspects, the techniques described herein relate to a method, wherein the first service is a session border control (SBC) and the second service is a voicemail service.

In some aspects, the techniques described herein relate to a method, wherein the second network session is a call for the subscriber to a third party number that is initiated by the voicemail service using the same instance of the SBC.

In some aspects, the techniques described herein relate to a method, wherein the first instance of the first service and the first instance of the second service are hosted on computing resources of a public cloud network, and wherein the SBC controls access to the public cloud network.

In some aspects, the techniques described herein relate to a method, wherein the second network session is a call to a second voicemail service using the same instance of the SBC.

In some aspects, the techniques described herein relate to a method, wherein a media path for the second network session includes the first instance of the first service and the first instance of the second service.

In some aspects, the techniques described herein relate to a method, further including shortening the media path at the first instance of the first service.

In some aspects, the techniques described herein relate to a non-transitory computer-readable medium storing computer-executable code, including code to: establish a first network session for a subscriber using a first instance of a first service and a first instance of a second service; and select, by the first instance of the second service, the first instance of the first service to establish a second network session for the subscriber, wherein the first network session remains active for a duration of the second network session.

In some aspects, the techniques described herein relate to a non-transitory computer-readable medium, wherein the code to select the first instance of the first service includes code to copy header information from a first session invite received at the first instance of the second service to a second session invite for the second network session.

In some aspects, the techniques described herein relate to a non-transitory computer-readable medium including instructions to perform any of the above methods.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

In a public cloud network, multiple instances of a service are often hosted on different computing resources. The multiple instances may provide geographic diversity for serving users in different regions. Multiple instances may also provide resiliency in the event of a failure as other instances may be utilized. In some cases, the multiple instances may provide efficient resource utilization and performance as a load can be balanced across the multiple instances.

In a case of long-lived sessions, use of multiple instances of the same service to provide the long-lived session, however, may actually increase chances of failure of the long-lived session. For example, in a long-lived session such as a telephone call or other live or streaming service, each instance of a service supporting the call may need to maintain a session for a duration of the call. In such a scenario, use of two different instances of the same service may actually increase likelihood of failure as a failure of either instance may end the long-lived session.

In an aspect, the present disclosure provides technique for re-using the same instance of a service when multiple sessions for a service are needed. For instance, in the case of voice over internet protocol (VoIP), a service such as a voicemail service may connect a call for the user to a call to another user or service. For instance, the voicemail service may allow the user to place an outgoing call to another number that left a voicemail. As another example, the voicemail service may connect the user to an external voicemail service to access certain stored voicemails. In either case, an original call to the voicemail service and an outgoing call may both access a service such as an SBC service. If two different instances of the SBC service are used, failure of either instance may result in a dropped call. In an aspect, to improve reliability of long-lived sessions, one or more services may be configured to select an instance of a service that is already being used for the long-lived session. By selecting the same instance of the service, the number of potential failure points for the long-lived session may be reduced and the reliability of the long-lived session may be improved.

Figure 2:
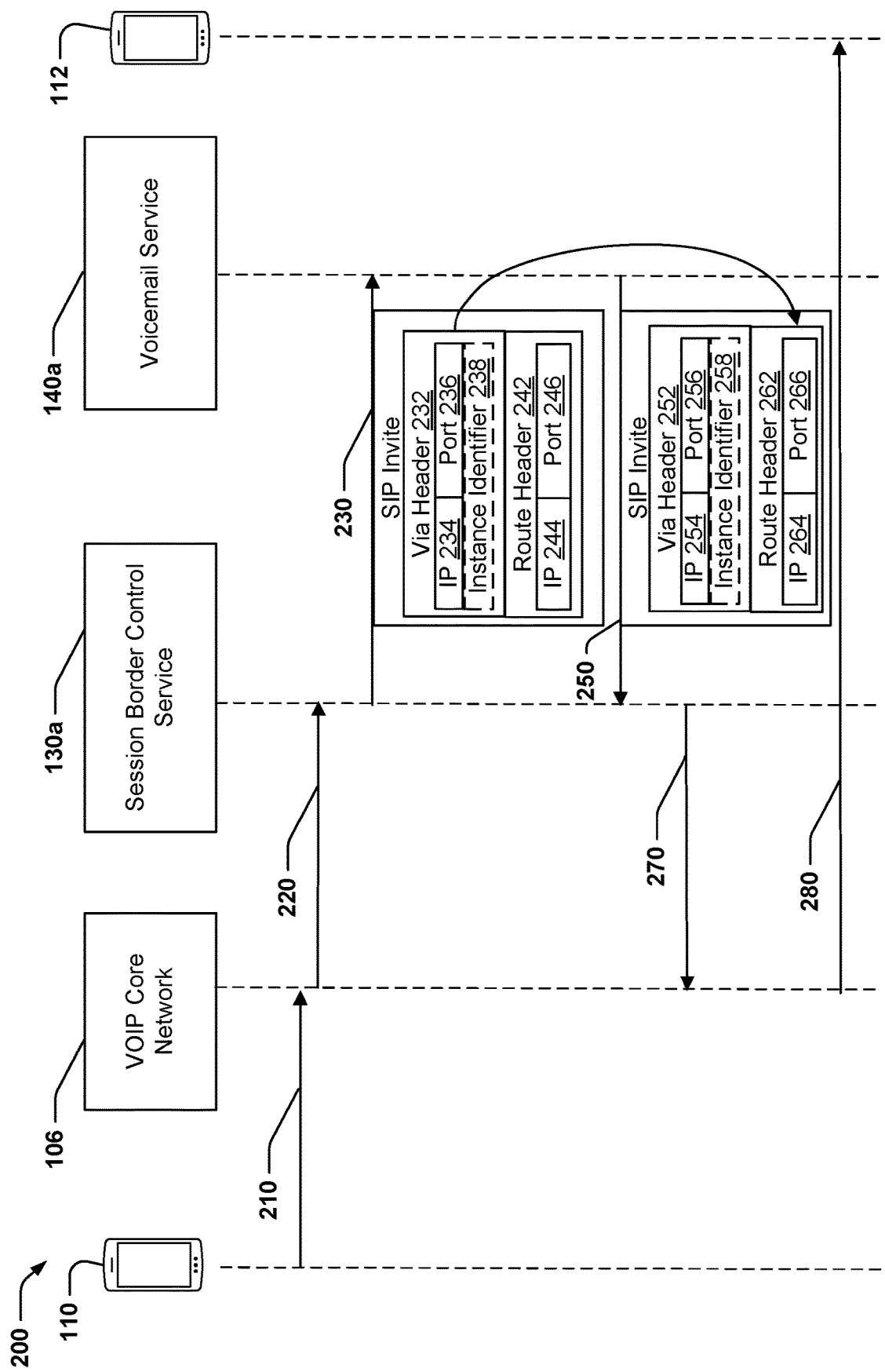
FIG. 2 is a diagram of an example of network messages for providing a service, in accordance with aspects described herein.
Figure 3:
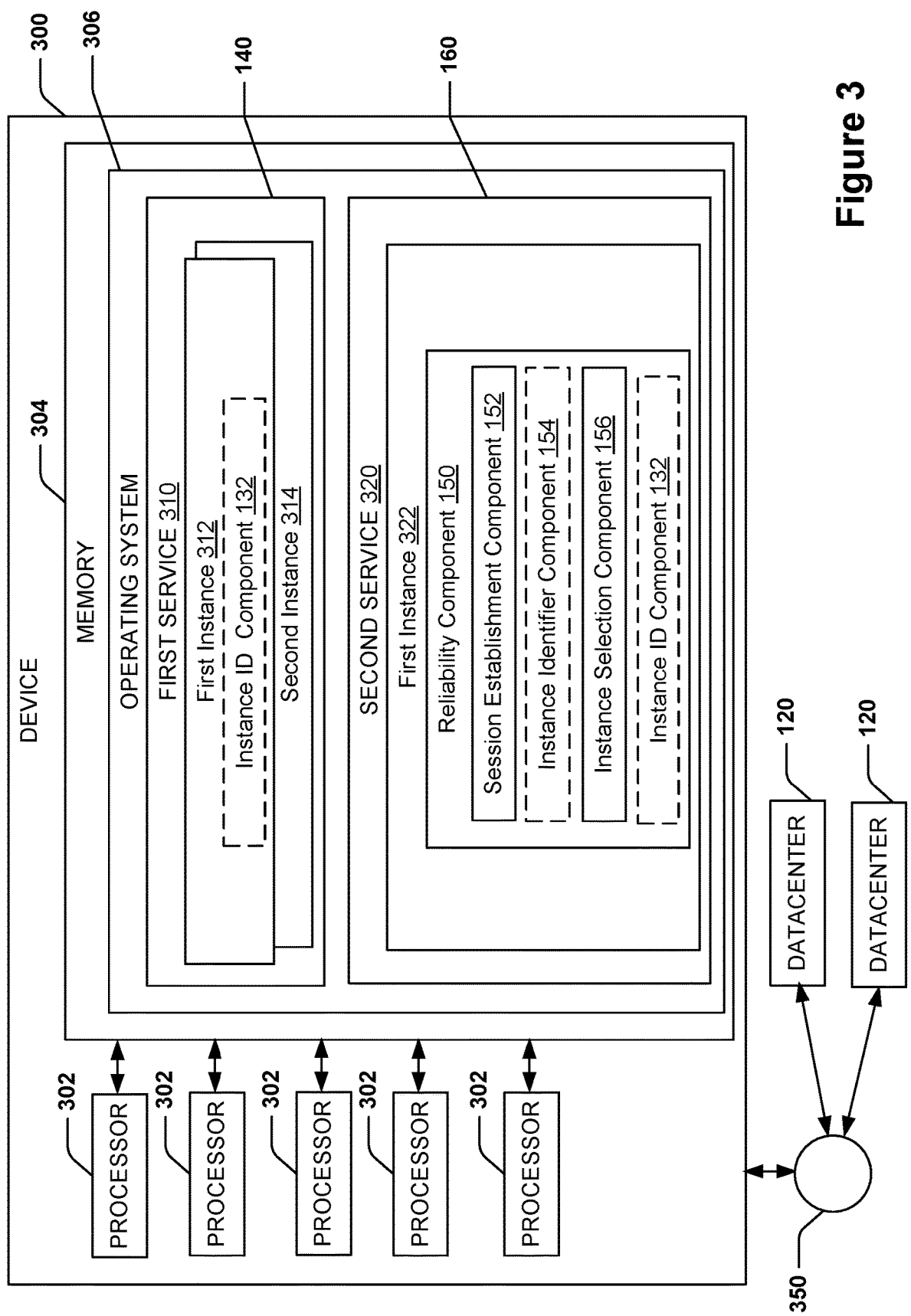
FIG. 3 is a schematic diagram of an example of a device for providing an instance, in accordance with aspects described herein.
Figure 4:
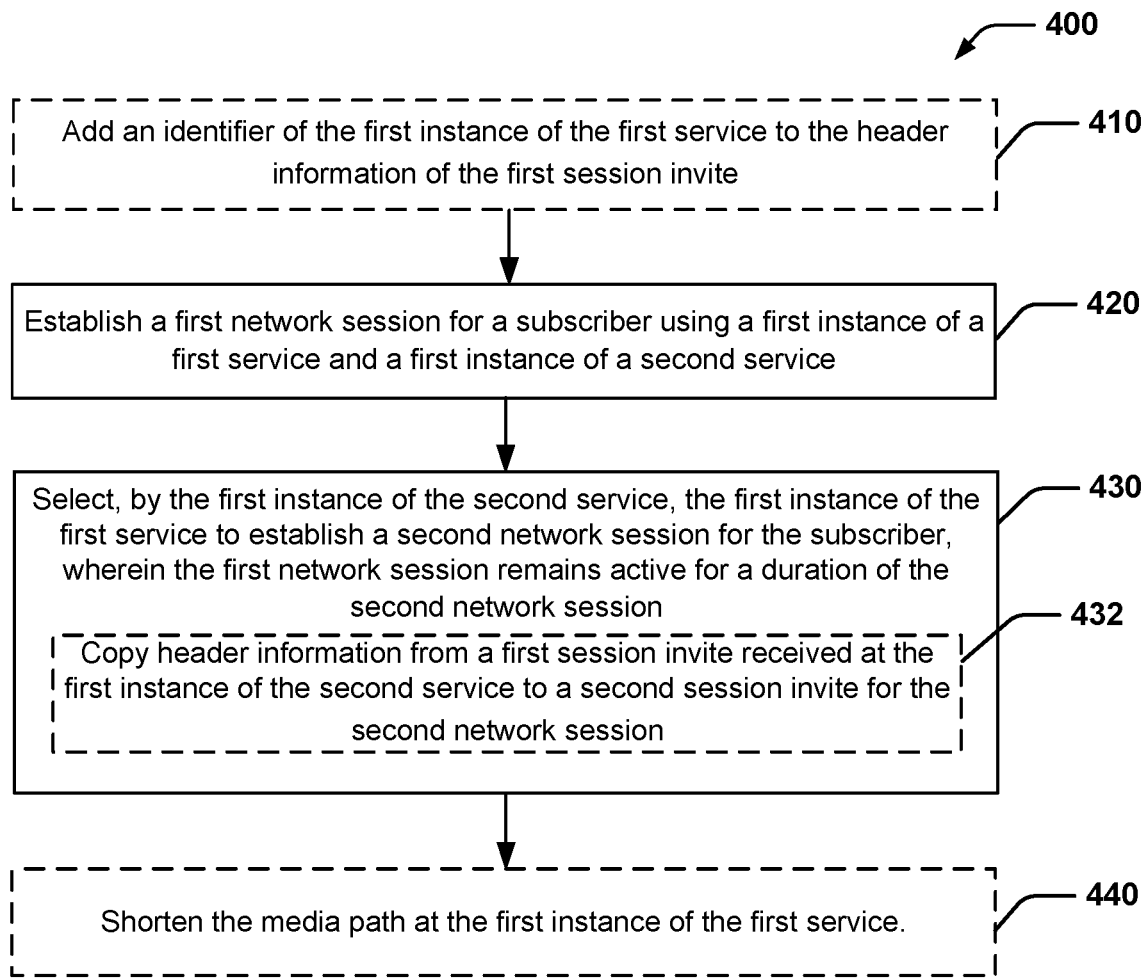
FIG. 4 is a flow diagram of an example of a method of proving a service, in accordance with aspects described herein.

Turning now to FIGS. 1-5, examples are depicted with reference to one or more components and one or more methods that may perform the actions or operations described herein, where components and/or actions/operations in dashed line may be optional. Although the operations described below in FIG. 4 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

Figure 1:
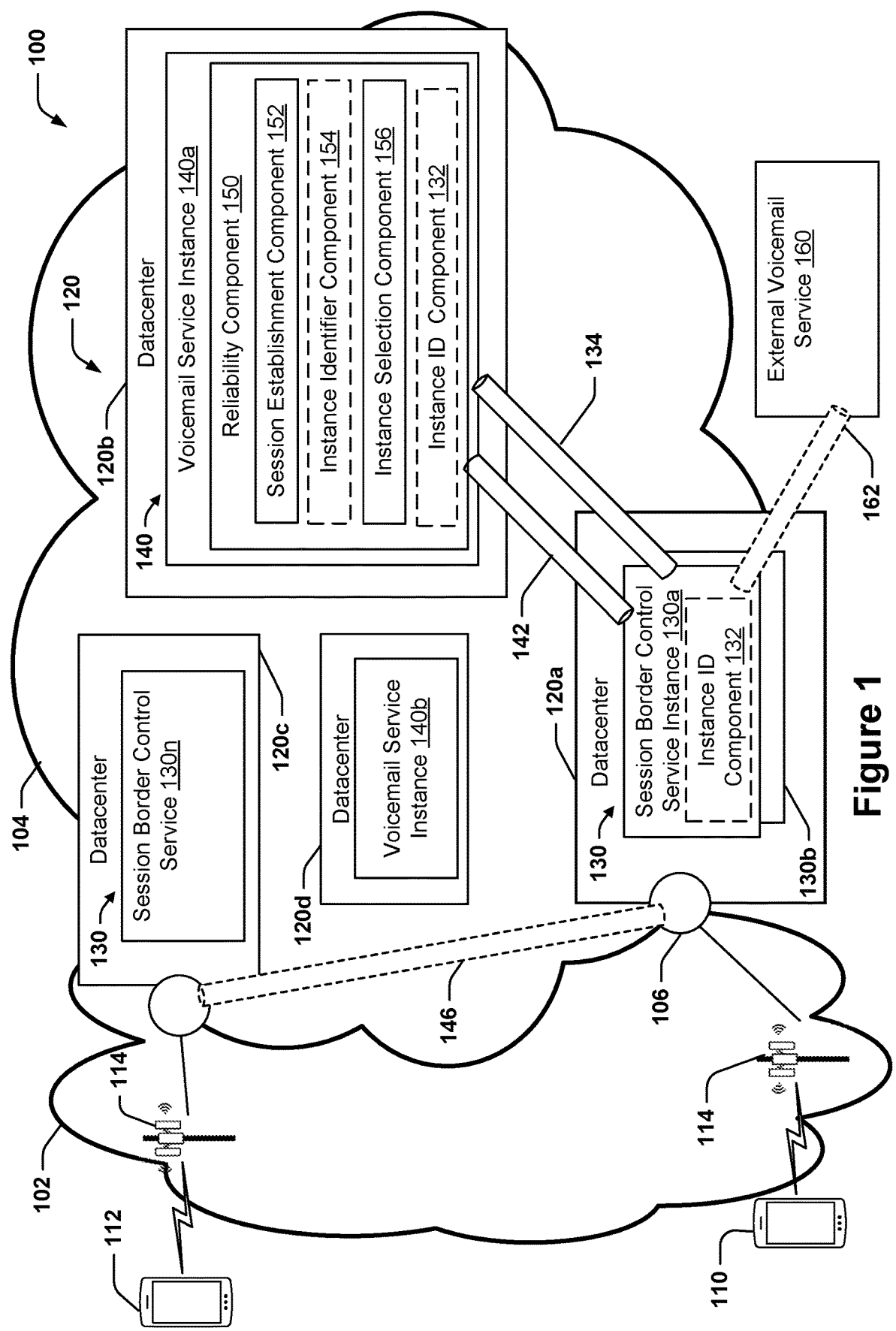
FIG. 1 is a diagram of an example of an architecture for providing a service, in accordance with aspects described herein.

FIG. 1 is a diagram of an example of an architecture of a network 100 for providing a service to a user. The network 100 may include an access network 102 and a cloud network 104.

The access network 102 may connect a user device 110 to IP services hosted in the cloud network 104. For example, the access network 102 may be a radio access network (RAN) including base stations 114 that provide wireless access to the user device 110. In some implementations, the access network 102 may include or connect to a core network 106 that is separate from the cloud network 104. In such implementations, the core network 106 may, for example, provide connectivity between subscribers to the same network. For example, a VoIP core network may perform routing of voice calls between subscribers. In other implementations, the functionality of the core network 106 may be implemented on computing resources of cloud network 104.

The cloud network 104 may provide computing resources for hosting various services. For example, the cloud network 104 may include multiple datacenters 120 (e.g., datacenters 120a, 120b, 120c, 120d). Each datacenter may include one or more servers that include computing hardware such as processors, memory, network interfaces, etc. for hosting a service. The cloud network 104 may instantiate multiple instances of a service at different datacenters. In some implementations, multiple instances of a service at the same datacenter 120 or in the same region may be referred to as a pool.

A long-lived session may refer to a stateful session for a user that may include one or more network sessions between services or instances thereof. A long-lived session may include a first network session that remains active for a duration of the second network session. A long-lived session may alternatively be referred to as a call. Although examples of long-lived sessions for voice calls are described, it should be understood that the concepts presented herein are applicable to other examples of long-lived sessions such as video calls, streaming media, real-time sessions, etc.

In an example scenario, a user may call a voicemail service to receive voicemail messages, and may use a live reply functionality to place an outgoing call to another number that left a voicemail message. To provide such a service to the user, the network 100 may provide a voicemail service 140, which may be instantiated at multiple datacenters 120 as voicemail service instances 140*a*, 140*b*. The user may be a subscriber to the access network 102, which provides wireless access for the user device 110 and IP connectivity to the cloud network 104. An operator of the access network 102 may host various services in the cloud network 104 for subscribers. For instance, the voicemail service 140 may be hosted in the cloud network 104 and provided as an IP service to the subscriber. In an aspect, to access the voicemail service 140, the access network 102 may initiate a call to a session border control (SBC) service 130 using a session initiation protocol (SIP) INVITE message. The access network 102 may select an instance 130*a* of the session border control service 130 using conventional instance-agnostic techniques such as round-robin or weighted random distribution. The SBC service 130 may route the call onward to the voicemail service 140 establishing a session 134 with the voicemail service instance 140*a*. The SBC service 130 may select an instance of the voicemail service 140 using an instance-agnostic technique. The call between the user device 110 and the voicemail service 140 may be considered a long-lived session including the session 134 and any sessions within the access network. The voicemail service 140 may add additional sessions to the call, for example, when additional services are needed to provide a requested functionality to the user. For instance, the live reply functionality may add an outgoing call to another user device 112, which may be accessible via the access network 102 or another access network. For such a call, the voicemail service 140 may establish a session 142 with an instance of the SBC service 130. If the voicemail service 140 utilizes instance-agnostic techniques for selecting the instance of the SBC service 130, the voicemail service 140 may select instance 130*b* (at the same datacenter 120*a*) or an instance 130*n* (at a different datacenter 120*c*) to establish the session 142 and further session 146. The long-lived session may then include two instances of the SBC service 130, and failure of either instance may result in failure of the long-lived session.

In another example use case, a voicemail service 140 may connect a caller with an external voicemail service 160. For example, the external voicemail service 160 may, for example, store voicemails that have not been migrated to the cloud network 104.

As in the above example use case, the access network 102 may initiate a call to a SBC service 130, which may route the call onward to the voicemail service 140, establishing the session 134. To connect the caller to the external voicemail service 160, the voicemail service 140 may establish a second session with the SBC service 130, which then establishes the session 162 with the external voicemail service 160. If the voicemail service 140 utilizes instance-agnostic techniques for selecting the instance of the SBC service 130, the long-lived session may then include two instances of the SBC service 130, and failure of either instance may result in failure of the long-lived session.

In an aspect, the voicemail service 140 may include a reliability component 150 configured to deterministically select an instance of a service that is already used for a long-lived session. The reliability component 150 may include a session establishment component 152 configured to establish an incoming session between a first instance of a first service (e.g., instance 130*a* of SBC service 130) and a first instance of a second service (e.g., voicemail service 140). The reliability component 150 may optionally include an instance identifier component 154 configured to identify one or more instances of services providing a long-lived session. The reliability component 150 may include an instance selection component 156 configured to select the first instance of the first service (.g., instance 130*a* of SBC service 130) to establish a second network session 142 for the subscriber. The first network session 134 may remain active for a duration of the second network session 142.

In some implementations, the first service (e.g., the SBC service 130) may include an instance ID component 132 configured to assist the second service with identifying an instance that initiates a first session. In some implementations, a session invite may include a header with a field that may be used to identify the instance requesting the session. For example, a SIP INVITE may include a source IP address. In other cases, for different service APIs and/or different network topologies, the mechanism to achieve service instance reuse may change. In some implementations, for example, steering info in the signaling messages may be used to reuse a more complete network path (e.g., if the SIP routing path goes through several proxies. The instance identifier component 154 may convert a whole Via header chain or Record-route into Route headers for the outbound path. As another example, the instance ID component 132 may send key identifiers from received requests (e.g., a software-defined perimeter (SDP)) in proprietary SIP headers to allow identification and reuse of the next hop in the media path. A proprietary header may allow selection of the same instance when there is no direct means to identify the sender (e.g., if the signaling and media paths are different). As another example, if there is a protocol-unaware n:1 or 1:n network address translation (NAT) between the services, identification of the instance may be difficult. One approach for such a scenario is to reuse an existing transport control protocol (TCP) stream from the inbound session for protocol flows associated with the outbound session, which will likely reuse the same NAT pinhole.

FIG. 2 is a message diagram 200 of examples of messages that may be used to establish a long-lived session including a previously used instance. The user device 110 may initiate a call to a voicemail service by sending a SIP INVITE 210 to a VoIP core network 106. The VoIP core network 106 may send another SIP INVITE 220 to a session border control service 130. In some implementations, the VoIP core network 106 may one or more back-to-back service agents, which are not illustrated for simplicity. Generally, the VoIP core network 106 may select any instance for the SBC service 130 because the long-lived session (e.g., the voice call) does not include an instance of the SBC service 130.

For example, the VoIP core network 106 may select SBC service instance 130a based on instance-agnostic techniques.

The SBC service 130 may send a SIP INVITE 230 to the voicemail service 140. In some implementations, although the long-lived session does not include an instance of the voicemail service 140, the SBC service 130 may be configured to support re-use of the SBC service instance 130a or a previous instance of a service. The SBC service instance 130a may generate the SIP INVITE 230 to include one or more headers such as a Via header 232 and a Route header 242. The Via header 232 may include a source IP address 234 and a source port 236, which may identify the SBC service instance 130a. In some cases, the SIP INVITE 230 may optionally include an instance identifier 238. The instance identifier 238 may be, for example, a proprietary SIP header with information that additionally or alternatively identifies the SBC service instance 130a. The Route header 242 may include a destination IP address 244 and a destination port 246, which may identify the selected instance of the voicemail service 140.

The voicemail service 140 may receive the SIP INVITE 230 to establish a first session with the SBC service instance 130a. The SIP sessions may establish a media path from the user device 110 through the VoIP core network 106 and SBC service instance 130a to the voicemail service 140. If the voicemail service 140 adds another call outside of the cloud network 104 to the long-lived session (e.g., to the user device 112 for the live callback functionality), the reliability component 150 of the voicemail service 140 may deterministically select the SBC service instance 130a. The reliability component 150 may generate the SIP INVITE 250 based on a header of the SIP invite 230 such as the Via header 232. For instance, the reliability component 150 may copy the source IP address 234 and/or source port 236 to the destination IP address 264 and port 266 of the route header 262 of the SIP INVITE 240. The source IP address 254 and the source port 256 of the Via header 252 may be the IP address and port of the voicemail service instance 140a. In another example, the instance identifier component 154 of the reliability component 150 may identify the SBC service instance 130a based on the instance identifier 238. In some implementations, the instance ID component 132 of the reliability component 150 may include an instance identifier 258 that identifies the voicemail service instance 140a in case another service wants to re-use the voicemail service instance 140a.

The SBC service instance 130a may complete the set up of the call to the user device 112 by sending a SIP INVITE 270 to the VoIP core network 106, which sends another SIP INVITE 280 to the user device 112. The SIP INVITES may establish a media path for the long-lived session from the user device 110, through the VoIP core network 106 and the SBC service instance 130a to the voicemail service instance 140a, then back to the SBC service instance 130a, the VoIP core network 106 (or a VoIP core of another access network for the user device 112) to the user device 112. In some implementations, a service instance that is re-used (e.g., the SBC service instance 130a) optionally may be configured to shorten the media path (e.g., by bypassing the voicemail service instance 140a).

FIG. 3 is a schematic diagram of an example of a device 300 (e.g., a computing device) for instantiating a service. The device 300 may be an example of a computing resource such as a server at a datacenter 120 that hosts a service such as the SBC service 130 or the voicemail service 140. The device 300 is connected to other servers within the datacenter via a switch 350 and may be connected to servers at other datacenters.

In an example, device 300 can include one or more processors 302 and/or memory 304 configured to execute or store instructions or other parameters related to providing an operating system 306, which can execute one or more applications or processes, such as, but not limited to, a service including the reliability component 150. For example, processor 302 and memory 304 may be separate components communicatively coupled by a bus (e.g., on a motherboard or other portion of a computing device, on an integrated circuit, such as a system on a chip (SoC), etc.), components integrated within one another (e.g., processor 302 can include the memory 304 as an on-board component), and/or the like. Memory 304 may store instructions, parameters, data structures, etc. for use/execution by processor 302 to perform functions described herein. In some implementations, the operating system 306 may include a container or virtual machine that provides isolation between different services instantiated on the device.

In an example, the memory 304 may include instructions for a first service 310. The processors 302 may execute the first service 310 to instantiate a first instance 312 and a second instance 314. Other devices at other datacenters 120 may execute additional instances of the first service 310. In some implementations, each instance may include an instance ID component 132 configured to add an identifier of the respective instance to outgoing session invites.

In an example, the memory 304 (or a memory at another device 300 at another datacenter 120) may include instructions for a second service 320. The processors 302 may execute the second service 320 to instantiate at least a first instance 322 of the second service 320. As discussed above, the second service 320 may include the reliability component 150.

FIG. 4 is a flow diagram of an example of a method 400 for long-lived session management. For example, the method 400 can be performed by a device 300 and/or one or more components thereof to establish one or more sessions between services within the long-lived session. For instance, the method 400 may be performed by a device implementing a second service to re-use a first instance of a first service. In some implementations, optional features of the method 400 may be performed by the first instance of the first service.

At block 410, the method 400 may optionally include adding an identifier of the first instance of the first service to the header information of the first session invite. In an example, the first instance of the first service 310, e.g., in conjunction with processor 302, memory 304, and operating system 306, can add an identifier 238 of the first instance 312 of the first service 310 to the Via header 232 of the first session invite 230.

At block 420, the method 400 includes establishing a first network session for a subscriber using a first instance of a first service and a first instance of a second service. In an example, the session establishment component 152 of the first instance of the second service 320, e.g., in conjunction with processor 302, memory 304, and operating system 306, can establish a first network session (e.g., session 134) for a subscriber using a first instance 312 of a first service 310 and a first instance 322 of a second service 320. For example, the session establishment component 152 may transmit a message to accept the invite. Example SIP messages include a 100 trying message, a 180 ringing message, or a 200 OK message. Procedures for establishing sessions under other protocols are known in the art.

At block 430, the method 400 includes selecting, by the first instance of the second service, the first instance of the first service to establish a second network session for the subscriber. The first network session remains active for a duration of the second network session. In an example, the instance selection component 156 of the reliability component 150 of the first instance 322 of the second service 320, e.g., in conjunction with processor 302, memory 304, and operating system 306, can select the first instance 312 of the first service 310 to establish a second network session (e.g., session 142) for the subscriber. The selection of the first instance is deterministic such that the long-lived session re-uses the previously used instance of the first service. The instance selection component 156 may transmit a session invite (e.g., SIP INVITE 250) to establish the second network session.

In some implementations, at block 432 the block 430 may optionally include copying header information from a first session invite received at the first instance of the second service to a second session invite for the second network session. For example, the instance selection component 156 may copy the source IP address 234 and port 256 from the Via header 232 of the SIP INVITE 230 to the destination IP address 264 and port 266 of the Route header 262 of the SIP INVITE 250.

In some implementations, where the instance ID component 132 of the first service 310 added the instance identifier 238 to the invite message, the instance identifier component 154 may identify the first instance 312 of the first service 310 based on the instance identifier 238. For example, the instance identifier 238 may be a proprietary header that provides instructions for contacting the first instance 312 of the first service 310 depending on security protocols between the first instance 312 of the first service 310 and the first instance 322 of the second service 320.

At block 440, the method 400 may optionally include shortening the media path at the first instance of the first service. In an example, the first instance 312 of the first service 310 may shorten the media path. For example, a control path may extend to the second service and it may be beneficial for the second service to stay on the control path, for example, to return to the voicemail service 140 after a live reply. In some cases, shortening the media path may be beneficial, for example, to save network bandwidth.

Figure 5:
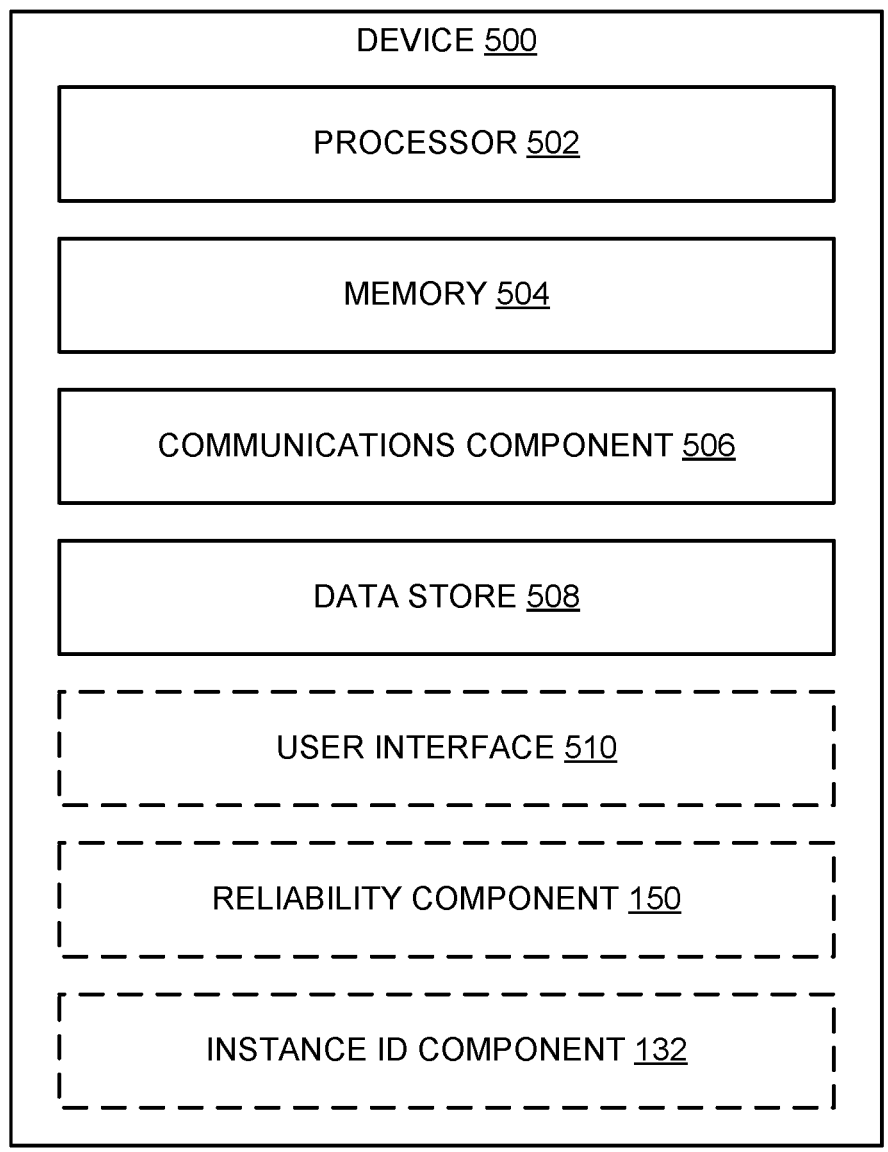
FIG. 5 is a schematic diagram of an example of a device for performing functions described herein, in accordance with aspects described herein.

FIG. 5 illustrates an example of a device 500 including additional optional component details as those shown in FIG. 3. In one aspect, device 500 may include processor 502, which may be similar to processor 302 for carrying out processing functions associated with one or more of components and functions described herein. Processor 502 can include a single or multiple set of processors or multi-core processors. Moreover, processor 502 can be implemented as an integrated processing system and/or a distributed processing system.

Device 500 may further include memory 504, which may be similar to memory 304 such as for storing local versions of operating systems (or components thereof) and/or applications being executed by processor 502, such as the first service 310, second service 320, etc. Memory 504 can include a type of memory usable by a computer, such as random access memory (RAM), read only memory (ROM), tapes, magnetic discs, optical discs, volatile memory, non-volatile memory, and any combination thereof.

Further, device 500 may include a communications component 506 that provides for establishing and maintaining communications with one or more other devices, parties, entities, etc. utilizing hardware, software, and services as described herein. Communications component 506 may carry communications between components on device 500, as well as between device 500 and external devices, such as devices located across a communications network and/or devices serially or locally connected to device 500. For example, communications component 506 may include one or more buses, and may further include transmit chain components and receive chain components associated with a wireless or wired transmitter and receiver, respectively, operable for interfacing with external devices.

Additionally, device 500 may include a data store 508, which can be any suitable combination of hardware and/or software, that provides for mass storage of information, databases, and programs employed in connection with aspects described herein. For example, data store 508 may be or may include a data repository for operating systems (or components thereof), applications, related parameters, etc.) not currently being executed by processor 502. In addition, data store 508 may be a data repository for the first service 310, second service 320, etc.

Device 500 may optionally include a user interface component 510 operable to receive inputs from a user of device 500 and further operable to generate outputs for presentation to the user. User interface component 510 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 510 may include one or more output devices, including but not limited to a display, a speaker, a haptic feedback mechanism, a printer, any other mechanism capable of presenting an output to a user, or any combination thereof.

Device 500 may additionally include a first service 310 including an instance ID component 132 for adding an identifier of a first instance of the first service 310 to a session invite message, a second service 320 including a reliability component 150 for re-using the first instance of the first service 310 for a second session, etc., as described herein.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. Non-transitory computer-readable media excludes transitory signals. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the claim language. Reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A system for routing sessions within a network, comprising:
    a first server hosting a first instance of a first service configured to establish a first network session for a subscriber with a first instance of a second service; and
    a second server hosting the first instance of the second service configured to select the first instance of the first service to establish a second network session for the subscriber, wherein the first network session remains active for a duration of the second network session and the first instance of the first service is re-used for both the first network session and the second network session,
    wherein to select the first instance of the first service, the second service is configured to:
        copy header information from a first session invite for the first network session received at the first instance of the second service to a second session invite for the second network session; and
        send the second session invite to the first instance of the first service on the first server based on the header information.

2. The system of claim 1, wherein the header information includes an internet protocol (IP) address of a source of the first session invite that is copied to a destination IP address in a header of the second session invite.

3. The system of claim 1, wherein the first service is configured to add an identifier of the first instance of the first service to the header information of the first session invite.

4. The system of claim 1, wherein the first service is a session border control (SBC) service and the second service is a voicemail service.

5. The system of claim 4, wherein the second network session is for a call for the subscriber to a third party number that is initiated by the voicemail service using a same instance of the SBC service.

6. The system of claim 4, wherein the network is a public cloud network, and wherein the SBC service controls access to the public cloud network.

7. The system of claim 4, wherein the second network session is for a call to a second voicemail service using a same instance of the SBC service.

8. A method of routing sessions, comprising:
    establishing a first network session for a subscriber using a first instance of a first service and a first instance of a second service; and
    selecting, by the first instance of the second service, the first instance of the first service to establish a second network session for the subscriber, wherein the first network session remains active for a duration of the second network session and the first instance of the first service is re-used for both the first network session and the second network session,
    wherein selecting the first instance of the first service to establish the second network session comprises:
        copying header information from a first session invite for the first network session received at the first instance of the second service to a second session invite for the second network session; and
        sending the second session invite to the first instance of the first service based on the header information.

9. The method of claim 8, wherein the header information includes an internet protocol (IP) address of a source of the first session invite that is copied to a destination IP address in a header of the second session invite.

10. The method of claim 8, wherein the first service is configured to add an identifier of the first instance of the first service to the header information of the first session invite.

11. The method of claim 8, wherein the first service is a session border control (SBC) and the second service is a voicemail service.

12. The method of claim 11, wherein the second network session is a call for the subscriber to a third party number that is initiated by the voicemail service using a same instance of the SBC.

13. The method of claim 11, wherein the first instance of the first service and the first instance of the second service are hosted on computing resources of a public cloud network, and wherein the SBC controls access to the public cloud network.

14. The method of claim 11, wherein the second network session is a call to a second voicemail service using a same instance of the SBC.

15. The method of claim 8, wherein a media path for the second network session includes the first instance of the first service and the first instance of the second service.

16. The method of claim 15, further comprising shortening the media path at the first instance of the first service.

17. A non-transitory computer-readable medium storing computer-executable code, comprising code to:
    establish a first network session for a subscriber using a first instance of a first service and a first instance of a second service; and
    select, by the first instance of the second service, the first instance of the first service to establish a second network session for the subscriber, wherein the first network session remains active for a duration of the second network session and the first instance of the first service is re-used for both the first network session and the second network session, wherein the code to select the first instance of the first service comprises code to:

copy header information from a first session invite for the first network session received at the first instance of the second service to a second session invite for the second network session; and send the second session invite to the first instance of the first service based on the header information.

18. The non-transitory computer-readable medium of claim 17, wherein the header information includes an internet protocol (IP) address of a source of the first session invite that is copied to a destination IP address in a header of the second session invite.

19. The non-transitory computer-readable medium of claim 17, wherein the first service is a session border control (SBC) service and the second service is a voicemail service.

20. The non-transitory computer-readable medium of claim 19, wherein the second network session is for a call for the subscriber to a third party number that is initiated by the voicemail service using a same instance of the SBC service.

* * * * *